Figure 4:
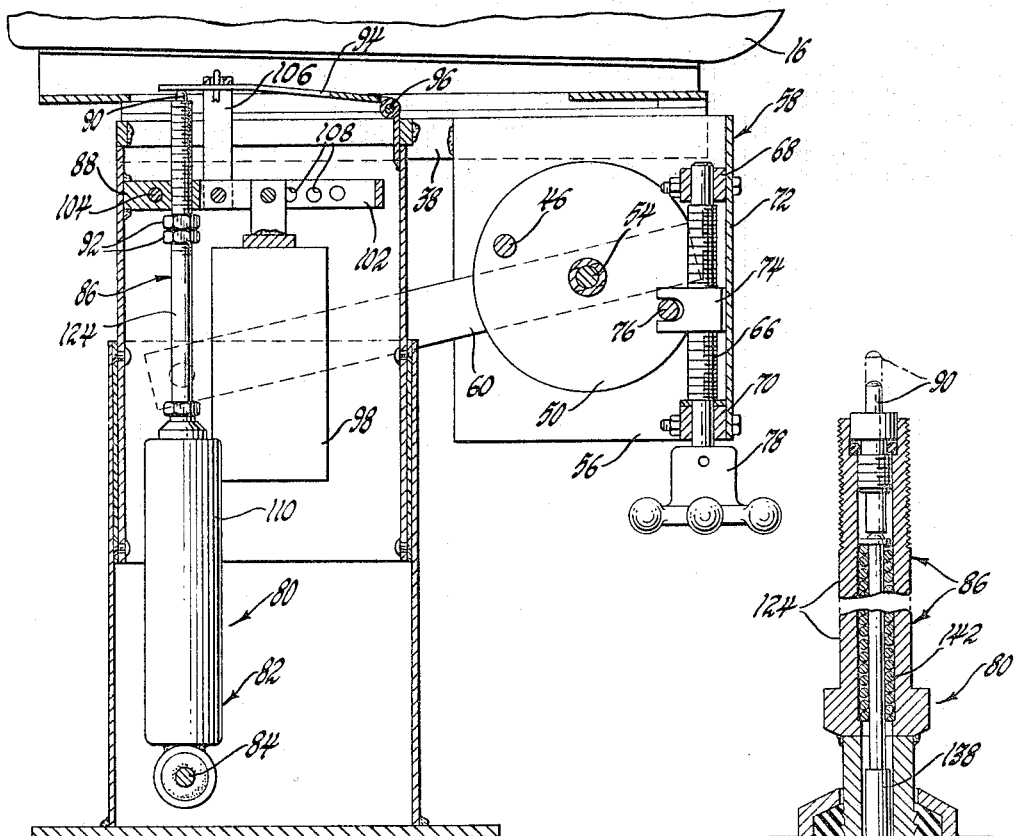

Sept. 27, 1966
W. A. ILLAR ETAL
3,275,277
VEHICLE SEAT
Filed Oct. 8, 1964
2 Sheets-Sheet 1
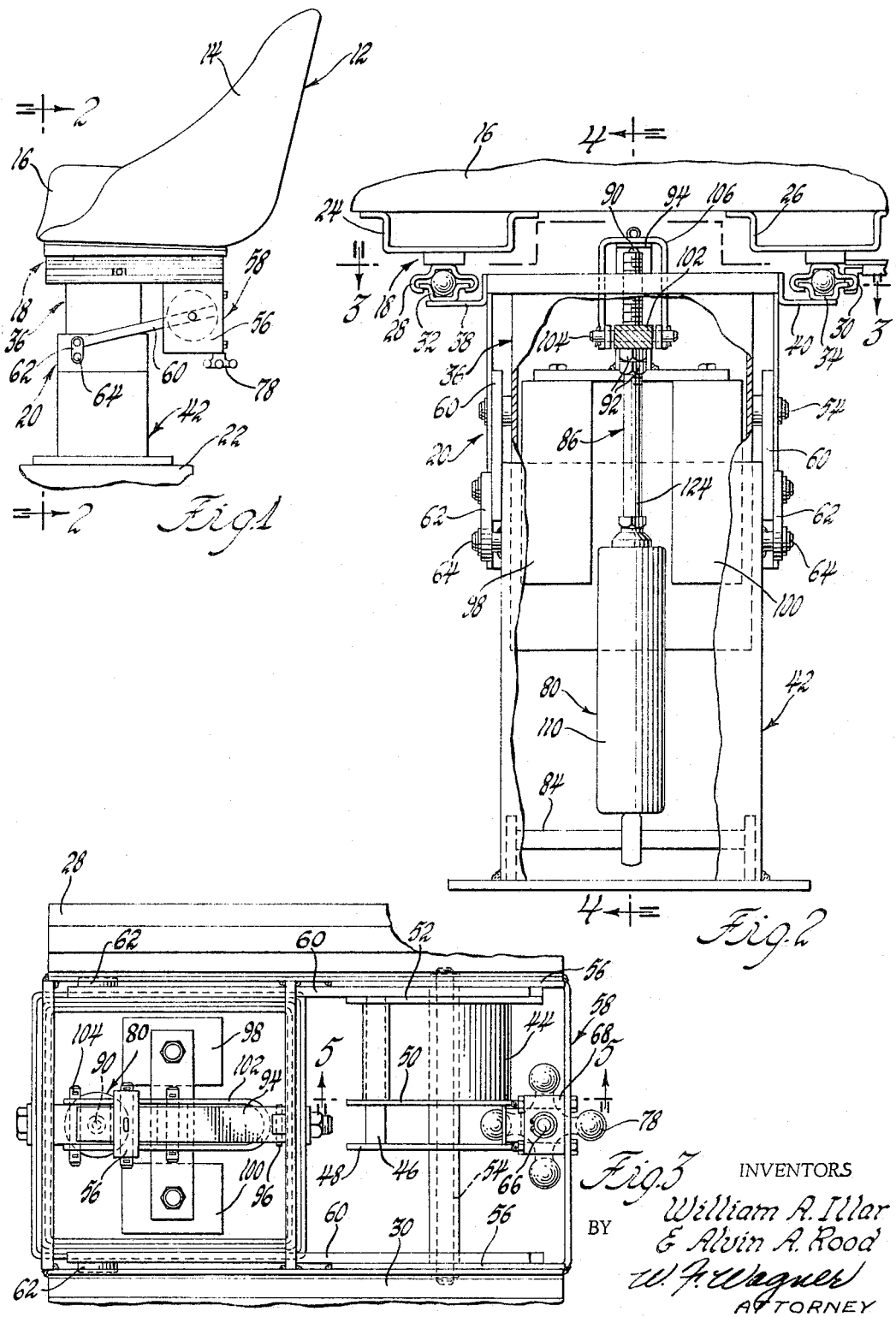
INVENTORS
William A. Illar
& Alvin A. Rood
BY
W. F. Wagner
ATTORNEY INVENTORS
William A. Illar
& Alvin A. Rood
BY W.F. Wegner
ATTORNEY

United States Patent Office 3,275,277
Patented Sept. 27, 1966

3,275,277
VEHICLE SEAT
William A. Illar, Cleveland, and Alvin A. Rood, Willoughby, Ohio, assignors to General Motors Corporation, Detroit, Mich., a corporation of Delaware
Filed Oct. 8, 1964, Ser. No. 402,497
4 Claims. (Cl. 248—399)

This invention concerns a seat assembly for an off-highway vehicle and more particularly an improved seat suspension that automatically varies the damping effect of an associated shock absorber in accordance with the severity of the bumps encountered by the vehicle.

The typical seat suspension for an off-highway vehicle seat is designed so that the amplitude of vibration of the seat is controlled by a shock absorber to provide a relatively smooth ride for the driver. However, in instances where severe road conditions have been encountered, the damping characteristics of the shock absorber and the manner the latter is incorporated in the seat suspension have been such that at times the seat spring is prevented from maintaining the seat with the driver. As a result, the driver frequently becomes weightless in the seat and experiences severe jarring whenever his body and the seat make full contact.

A seat suspension assembly alleviates the above-mentioned problem can be seen in the copending patent application Serial No. 353,097, filed March 19, 1964, now Patent No. 3,211,411 granted Oct. 12, 1965, in the name of A. A. Rood and assigned to the assignee of this invention. More specifically, the assembly shown employs a shock absorber having high and low damping characteristics so that whenever the driver becomes weightless in the seat the damping effect of the shock absorber is decreased and the spring portion of the suspension assembly is allowed to maintain the seat with the driver. This is accomplished by having the seat connected to the suspension assembly for independent movement relative to the latter between two vertically spaced positions. A dual range damping shock absorber is provided in the suspension assembly and operatively connected to the seat so that in one of the seat positions the shock absorber experiences high damping characteristics while in the other position the shock absorber has low damping characteristics.

The present invention concerns an improved seat suspension assembly of the above-described type which is characterized by the use of acceleration forces acting on a movable mass or weight for controlling the damping characteristics of a shock absorbing device. More specifically, the invention contemplates a seat assembly comprising a seat portion that is fixedly secured to an upper cylinder member which is reciprocably received within a base cylinder member fastened to a vehicle floor. A suspension assembly resiliently supports the seat on the base cylinder member for oscillating movement relative to the latter and includes a torsion spring interconnected between the cylinder members. A dual range shock absorbing device is interconnected between the cylinder members and includes means for modulating the damping effect thereof. An actuator is pivotally supported on the upper cylinder member and operatively associated with the last-mentioned means for normally maintaining the shock absorbing device in a damped state. A weight is pivotally supported by the seat and operatively connected to the actuator so that during oscillating movement of the seat, any vertical upward movement of the weight relative to the seat results in movement of the actuator to thereby control the damping effect of the shock absorbing device.

Figure 5:
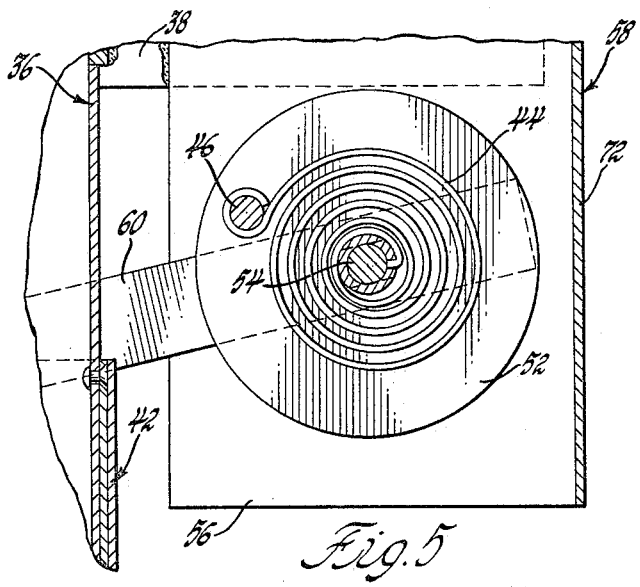

A more complete understanding of the invention will be derived from the following detailed description when taken in conjunction with the drawings in which:

FIGURE 1 is a side elevational view of a vehicle seat made in accordance with the invention, FIGURE 2 is an enlarged fragmentary view partly in section taken along lines 2—2 of FIGURE 1, FIGURE 3 is a view taken along lines 3—3 of FIGURE 2, FIGURE 4 is a sectional view taken along lines 4—4 of FIGURE 2, FIGURE 5 is an enlarged view showing the torsion spring employed with the vehicle seat shown in FIGURES 1 through 4, and FIGURE 6 is an enlarged sectional view showing the details of the shock absorbing device incorporated with the vehicle seat of FIGURE 1.

Referring now to FIGURE 1 of the drawings, a vehicle seat assembly is shown comprising a seat 12 having a backrest portion 14 and a cushion portion 16 rigidly mounted on a seat support assembly 18 which, in turn, is connected through a suspension assembly 20 to the vehicle floor 22.

More specifically, the seat support assembly includes a pair of laterally spaced elongated channel members 24 and 26 which rigidly connect the cushion portion 16 to a pair of elongated rail members 28 and 30. The rail members are adapted to ride along associated track members 32 and 34 which in turn are secured to the opposite sides of an upper cylinder member 36 by the angle iron supports 38 and 40. Thus, the seat support assembly allows the seat to be adjustable in the sense that it can be moved forwardly or rearwardly relative to the suspension assembly. It will be understood that suitable manually operable locking means (not shown) are provided for fixing the seat in one position relative to the cylinder member 36 as is conventional in seats of this type.

As best seen in FIGURES 2 through 5, the suspension assembly 20 includes the upper cylinder member 36, the lower end of which telescopes into a base cylinder member 42. In addition, the suspension assembly 20 includes a torsion spring 44, one end of which is wound about a pin 46 that is fastened to and extends between disk members 48, 50, and 52. The other end of the spring 44 is wedged in a pivot pin 54 that is rotatably supported by the side walls 56 of a box frame 58 welded to the angle iron 38 and 40. Each end of the pivot pin 54 is rigidly connected with a lever 60 that extends forwardly for pivotal connection with a link 62. The link 62, in turn, is pivotally mounted on the side of the base cylinder member 42 by a pin 64. As seen in FIGURE 2 and as should be apparent, both sides of the seat assembly are provided with a similar lever and link arrangement, as described above. Thus, when the seat 12 and the attached upper cylinder member 36 move downwardly relative to the base cylinder member 42, the torsion spring 44 is wound through the levers 60 so as to provide a resilient support for the seat.

Tension adjustment of the spring 44 is realized through a rotatable tension screw 66 supported by bearing blocks 68 and 70 on an end wall 72 of the box frame 58. A tension clevis 74 is threaded on the tension screw and cooperates with a pin 76 secured to the disc members 48 and 50 so that the tension of the torsion spring can be adjusted by rotating a knob 78 secured to the lower end of the tension screw. Thus, the seat occupant is able to select the type of ride he desires in relationship to his weight and irregularities of the terrain over which the vehicle is to be operated by adjusting the tension in spring 44.

As is customary in seat constructions of the above-described type, a shock absorbing device 80 is included with the suspension system so as to prevent any severe rebound and bottoming of the seat 12 as it oscillates relative to the base cylinder member. In this instance, the shock absorbing device 80 is preferably mounted in a vertical plane and has the cylinder portion 82 fixed to the base cylinder member 42 by a transverse pin 84 while the rod portion 86 is adjustably fixed in a bracket 88 rigid with the inner wall of the upper cylinder member 36. The free end of the rod portion 86 terminates with a push button 90 which, by loosening the nuts 92, can be positioned a predetermined distance from an actuator arm 94 which is pivotally supported on the upper end of the upper cylinder member 36 by a pin 96 for movement about a transverse axis.

The actuator arm 94 is adapted to pivot about the pin 96 for depressing and releasing the push button 90 for purposes which will be more fully understood as the description of the invention proceeds. Moreover, movement of the actuator arm 94 occurs in response to vertical movement of the weights 98 and 100 supported by a yoke member 102, which in turn, is pivotally mounted on the bracket 88 by a pin 104. A clevis member 106 fixedly connects the yoke member with the actuator arm. In addition, it will be noted that the yoke member is provided with a plurality of apertures 108 which permit the weights to be moved to different positions for varying the loading on the push button 90.

Figure 6:
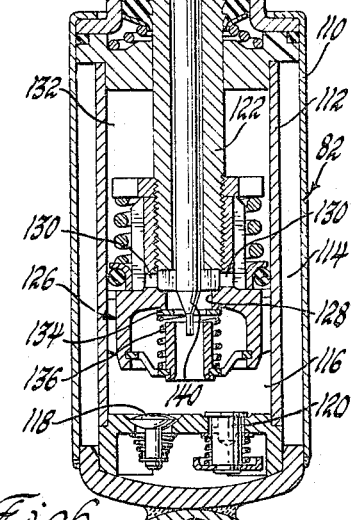

Referring now to FIGURE 6, the cylinder portion 82 of the shock absorbing device 80 comprises a pair of spaced concentric shells 110 and 112 between which a fluid reservoir 114 is provided that communicates with a chamber 116 through check valves 118 and 120. The rod portion 86 comprises a pair of axially aligned and interconnected tubular members 122 and 124. The inner end of the tubular member 122 is fixed with a piston 126 having an orifice 128 which, through radially extending passages 130, connects the chamber 116 with a chamber 132. A washer shaped valve 134 is normally biased into the position shown by a spring 136 so as to restrict fluid flow through the orifice 128. A slidable plunger 138 is provided in the tubular members 122, 124 and is formed with a conical tip 140 at the lower end that is adapted to be moved between the full line position and that indicated by the phantom lines. To effect such movement, the push button 90 is provided, the lower end of which contacts the top of the plunger 138 and acts against the force of a coil spring 142. Thus, when the push button is depressed, the plunger 138 assumes the full line position; however, when the push button 90 is released, the tip 140 moves to the position shown in phantom lines.

The operation of the shock absorbing device 80 is quite conventional and it will be understood that as the piston 126 moves in the downward direction or into the cylinder portion 82, the fluid in the chamber 116 flows through the orifice 128 and the passages 130 into the upper chamber 132. On the other hand, as the shock absorbing device is expanded so that the piston 126 is moving in an upward direction relative to the cylinder portion 82, the fluid in chamber 132 flows via the passages 130 and orifice 128 into the chamber 116. In the latter instance, however, the valve 134 is opened by the fluid flow so that during expansion, the device has a speed rate greater than during contraction. As is conventional, the check valves 118 and 120 provide the makeup fluid and also serve to exhaust fluid to the reservoir 114 depending upon the direction of movement of the piston rod so as to compensate for the volume differential between the head and rod end of the device. In addition, it should be noted that during either expansion or contraction movement of the shock absorbing device 80, the plunger 138 may be moved into the orifice, as alluded to above, so as to restrict fluid flow through the orifice. In other words, the plunger provides a means for modulating the fluid flow through the orifice to thereby increase the damping effect of the shock absorbing device in both directions of movement.

The operation of this seat assembly is as follows:

When the vehicle is traveling over relatively smooth terrain, the shocks transmitted to the vehicle will be of small magnitude so that the seat 12 oscillates with small amplitude and acceleration. As a result, the weights 98 and 100 move in phase with the seat 12 and the actuator arm 94 maintains the relationship of FIGURE 4 with respect to the upper cylinder member 36 with the push-button 90 depressed and the influence of the torsion spring 44 being resisted by the shock absorbing device 80 in the fully damped state. However, in instances where the vehicle is driven over very bumpy terrain, the oscillating movement of the seat 12 will frequently become very drastic. During such time and when using a conventional vehicle seat, the movement of the occupant's body often is out of phase with the movement of the seat. In other words, the occupants may be moving upwardly while the seat moves down and when the direction of movement of the two reverses, a violent jarring of the occupant occurs. This can be attributed primarily to the typical spring and shock absorber arrangement found in prior vehicle seats which prevent the seat from staying with the occupant when the seat moves upwardly under the influence of high acceleration forces. With this invention, however, when such a condition arises, even though the shock absorbing device 80 attempts to limit the velocity of the seat 12, the acceleration forces acting on the weights 98 and 100 will cause the latter to move upwardly relative to the seat 12 so as to raise the actuator arm 94. As aforedescribed, this action permits the spring 142 in the shock absorbing device 80 to move the plunger 138 upwardly to decrease the damping effect. When this happens, the torsion spring 44 is able to raise the seat at a faster rate and maintain the seat with the occupant to avoid a collision of the type described above. The extent of upward movement of the actuator arm 94 with respect to the upper cylinder member 36, of course, is governed by the severity of the bumps encountered by the vehicle and it is conceivable that at various times a complete release of the push button 90 does not occur. In other words, in some instances there may be a slight degree of relative movement between the actuator arm 94 and the cylinder member 36 so that the push button 90 is permitted to rise a small amount only. In those instances, although the degree of damping effect of the shock absorbing device is decreased, this decrease is less than that which occurs when complete contact is lost between the actuator arm and push button. Accordingly, the fluid flow through the piston of the shock absorber is modulated in accordance with the severity of the bumps encountered so that the seat occupant realizes the most comfortable ride at all times.

Various changes and modifications can be made in the above-described vehicle seat construction without departing from the spirit of the invention. It should be understood that such changes and modifications are contemplated by the inventors and they do not wish to be limited except by the scope of the appended claims.

What is claimed is:

1. In combination with a vehicle floor, a seat, a base cylinder member fixed at one end to said vehicle floor, an upper cylinder member having one end thereof telescoping into said base cylinder member and the other end secured to said seat, a suspension assembly resiliently supporting said seat on said base cylinder member for oscillating movement relative to the latter, said suspension assembly comprising a spring interconnected between said cylinder members, a shock absorbing device interconnected between said cylinder members for damping said oscillating movement, said shock absorbing device having means for modulating the damping effect thereof, said last-mentioned means including a moveable member which when depressed increases the damping effect of said shock absorbing device and when released decreases said damping effect during the compression and expansion stroke, an actuator pivotally supported on the upper cylinder member and operatively associated with said movable member for normally maintaining the latter in a depressed state, a mass pivotally connected to the upper cylinder member and operatively associated with said actuator, said mass being responsive to acceleration forces to provide relative vertical movement between said mass and said upper cylinder member so as to control the position of the actuator and the damping effect of the shock absorbing device during oscillating movement of the seat.

2. In combination with a vehicle floor, a seat, a base cylinder member fixed at one end to said vehicle floor, an upper cylinder member having one end thereof telescoping into said base cylinder member and the other end secured to said seat, a suspension assembly resiliently supporting said seat on said base cylinder member for oscillating movement relative to the latter, said suspension assembly comprising a torsion spring interconnected between said cyilnder members, a shock absorbing device interconnected between said cylinder members for damping said oscillating movement, said shock absorbing device having means for modulating the damping effect thereof, said last-mentioned means including a push button which when depressed increases the damping effect of said shock absorbing device and when released decreases said damping effect, an actuator pivotally supported on the upper cylinder member and operatively associated with said push button for normally maintaining the latter in a depressed state, a mass, and means operatively connecting said mass to said actuator whereby relative vertical movement between said mass and said upper cylinder member caused by acceleration forces serves to control the position of the actuator and the damping effect of the shock absorbing device during oscillating movement of the seat.

3. In combination with a vehicle floor, a base member fixed at one end to said vehicle floor, an upper member having one end thereof telescoping into said base member and the other end secured to said seat, a suspension assembly resiliently supporting said seat on said base member for oscillating movement relative to the latter, said suspension assembly comprising a spring interconnected between said members, a shock absorbing device interconnected between said members for damping said oscillating movement, said shock absorbing device having means for modulating the damping effect thereof, said last-mentioned means including a push button which when depressed increases the damping effect of said shock absorbing device and when released decreases said damping effect, an actuator pivotally supported on the upper member and operatively associated with said push button for normally maintaining the latter in a depressed state, a mass, a yoke member pivotally connecting said mass to the upper cylinder member below the actuator, a clevis member connecting said yoke member to said actuator whereby relative vertical movement bewteen said mass and said upper member caused by acceleration forces serves to control the damping effect of the shock absorbing device during oscillating movement of the seat.

4. In combination with a vehicle floor, a seat, a base cylinder member fixed at one end to said vehicle floor, an upper cylinder member having one end thereof telscoping into said base cylinder member and the other end secured to said seat, a suspension assembly resiliently supporting said seat on said base cylinder member for oscillating movement relative to the latter, said suspension assembly comprising a torsion spring interconnected between said cyilnder members, a shock absorbing device interconnected between said cylinder members for damping said oscillating movement, said shock absorbing device having movable means for modulating the damping effect thereof, said last-mentioned means including a push button assembly, said push button assembly operatively connected to a fluid flow restricting device so that said push button assembly increases the damping effect of said shock absorbing device when depressed and decreases said damping effect when released during the expansion and compression stroke of said shock absorbing device, an actuator arm pivotally supported on the upper cylinder member and operatively associated with said push button for normally maintaining the latter in a depressed state, a mass, a yoke member pivotally connecting said mass to the upper cylinder member below the actuator, a clevis member connecting said yoke member to said actuator arm whereby relative vertical movement between said mass and said upper cylinder member caused by acceleration forces serves to control the damping effect of the shock absorbing device during oscillating movement of the seat.

References Cited by the Examiner
UNITED STATES PATENTS

| 2,893,470 | 7/1959 | Peller | 248—400 |
| 2,950,785 | 8/1960 | Patriquin | 188—88 |
| 3,109,621 | 11/1963 | Simons et al. | 248—399 |
| 3,198,473 | 8/1965 | Nolz | 248—399 |

FOREIGN PATENTS 794,354   4/1958   Great Britain.

CLAUDE A. LE ROY, *Primary Examiner.*

R. P. SEITTER, *Assistant Examiner.*